(12) United States Patent
Park et al.

(10) Patent No.: US 11,645,853 B2
(45) Date of Patent: May 9, 2023

(54) DRIVING LANE DETERMINATION APPARATUS AND METHOD

(71) Applicants: Hyundai Motor Company, Seoul (KR); Kia Motors Corporation, Seoul (KR)

(72) Inventors: Da Yeon Park, Hwaseong-si (KR); Dong Gyu Noh, Hwaseong-si (KR); Su Lyun Sung, Seoul (KR); Dae Sung Hwang, Hwaseong-si (KR); Cho Rong Ryu, Incheon (KR); Bong Kwan Choi, Seoul (KR); Jun Ho Park, Gwangmyeong-si (KR); Joo Chul Bae, Seoul (KR); Su Ho Park, Seoul (KR); Seon Ho Kang, Hwaseong-si (KR); Hahk Rel Noh, Bucheon-si (KR); Tae Jun Lee, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 535 days.

(21) Appl. No.: 16/844,229

(22) Filed: Apr. 9, 2020

(65) Prior Publication Data
US 2021/0182574 A1 Jun. 17, 2021

(30) Foreign Application Priority Data
Dec. 16, 2019 (KR) .................. 10-2019-0167624

(51) Int. Cl.
*G06K 9/00* (2022.01)
*B60W 40/04* (2006.01)
*B60W 30/12* (2020.01)
*G06V 20/56* (2022.01)
*G06V 20/58* (2022.01)

(52) U.S. Cl.
CPC .......... *G06V 20/588* (2022.01); *B60W 30/12* (2013.01); *B60W 40/04* (2013.01); *G06V 20/58* (2022.01)

(58) Field of Classification Search
CPC ..... G06V 20/588; G06V 20/58; B60W 30/12; B60W 40/04
See application file for complete search history.

(56) References Cited

U.S. PATENT DOCUMENTS

| 10,816,993 | B1 * | 10/2020 | Tran ................. G06V 20/56 |
| 10,928,830 | B1 * | 2/2021 | Tran ................. G05D 1/0088 |
| 2009/0043504 | A1 * | 2/2009 | Bandyopadhyay .. G01C 21/206 701/469 |

(Continued)

*Primary Examiner* — Peter D Nolan
*Assistant Examiner* — Demetra R Smith-Stewart
(74) *Attorney, Agent, or Firm* — Slater Matsil, LLP

(57) ABSTRACT

A driving lane determination method includes acquiring map information and driving environment information, deciding whether to perform driving lane determination entry based on the map information and the driving environment information, matching the map information and the driving environment information to calculate a matching point of each lane upon deciding the driving lane determination entry, deciding a matching lane based on the calculated matching point, deciding a tracking lane based on a prediction lane predicted from a previous driving lane and lane change determination upon deciding the matching lane, and deciding a final driving lane based on the decided matching lane and the decided tracking lane.

18 Claims, 13 Drawing Sheets

(56) References Cited

U.S. PATENT DOCUMENTS

| | | | |
|---|---|---|---|
| 2015/0379359 A1* | 12/2015 | Han | B60R 1/00 348/148 |
| 2019/0064827 A1* | 2/2019 | Goto | B60T 8/17 |
| 2019/0095514 A1* | 3/2019 | Anastassov | G06F 16/287 |

* cited by examiner

DRIVING LANE DETERMINATION APPARATUS AND METHOD

CROSS-REFERENCE TO RELATED APPLICATIONS

This application claims priority to Korean Patent Application No. 10-2019-0167624, filed on Dec. 16, 2019, which application is hereby incorporated herein by reference.

TECHNICAL FIELD

The present disclosure relates to a driving lane determination apparatus and method.

BACKGROUND

In general, an autonomous vehicle is a vehicle that recognizes a surrounding environment and decides a driving path using external information sensing and processing functions during driving and that drives independently using its own power.

The autonomous vehicle may drive to a destination while preventing collision with an obstacle present in the driving path and adjusting the speed and driving direction thereof depending on the shape of a road without a driver manipulating a steering wheel, an accelerator, or a brake.

A positioning system applied to the autonomous vehicle may decide the current position of the vehicle using global positioning system (GPS) position data acquired during driving and sensor data acquired through a sensor mounted to the vehicle based on load map information constructed using a GPS and various sensors.

In particular, precise positioning, which estimates the position of a host vehicle, is essential technology for autonomous driving necessary for surrounding environment recognition, vehicle control, and driving strategy change.

In the case in which the host vehicle enters a crowded road, such as a section in which lane extension and merging are repeated or an intersection, driving lane determination may be difficult, and therefore the host vehicle may encounter a driving lane determination error and thus may cause an accident.

Therefore, there is a need to develop a driving lane determination apparatus capable of accurately determining a driving lane on a crowded road and evaluating accurate positioning reliability based thereon.

SUMMARY

The present disclosure relates to a driving lane determination apparatus. Particular embodiments relate to a driving lane determination apparatus and a driving lane determination method capable of determining a driving lane utilizing precise map information and sensor fusion information and evaluating precise positioning reliability of the result thereof.

Accordingly, the present disclosure is directed to a driving lane determination apparatus and a driving lane determination method thereof that can substantially obviate one or more problems due to limitations and disadvantages of the related art.

Embodiments of the present invention provide a driving lane determination apparatus and a driving lane determination method thereof capable of calculating a matching point of each lane utilizing precise map information and sensor fusion information and deciding a driving lane based on the calculated matching point, thereby accurately determining the driving lane and evaluating precise positioning reliability based thereon.

While the present invention is devised to solve certain problems, the invention is not limited to the solution of any particular problem.

In one embodiment, a driving lane determination apparatus includes an information acquisition unit configured to acquire map information and driving environment information. A driving lane determination entry decision unit is configured to decide whether to perform driving lane determination entry based on the map information and the driving environment information. A matching point calculation unit is configured to match the map information and the driving environment information to calculate a matching point of each lane upon deciding the driving lane determination entry. A matching lane decision unit is configured to decide a matching lane based on the calculated matching point. A tracking lane decision unit is configured to decide a tracking lane based on a prediction lane predicted from the previous driving lane and lane change determination upon deciding the matching lane. A final driving lane decision unit is configured to decide a final driving lane based on the decided matching lane and the decided tracking lane.

In another aspect of the present invention, a driving lane determination method of a driving lane determination apparatus includes acquiring map information and driving environment information, deciding whether to perform driving lane determination entry based on the map information and the driving environment information, matching the map information and the driving environment information to calculate a matching point of each lane upon deciding the driving lane determination entry, deciding a matching lane based on the calculated matching point, deciding a tracking lane based on a prediction lane predicted from the previous driving lane and lane change determination upon deciding the matching lane, and deciding a final driving lane based on the decided matching lane and the decided tracking lane.

In another aspect of the present invention, a computer-readable recording medium containing a program for performing a driving lane determination method of a driving lane determination apparatus executes processes included in the driving lane determination method.

In a further aspect of the present invention, a vehicle includes a communication apparatus configured to receive map information. A sensing apparatus is configured to sense driving environment information of a host vehicle. A driving lane determination apparatus is configured to determine a driving lane of the host vehicle based on the map information and the driving environment information. The driving lane determination apparatus decides whether to perform driving lane determination entry based on the map information and the driving environment information, matches the map information and the driving environment information to calculate a matching point of each lane upon deciding the driving lane determination entry, decides a matching lane based on the calculated matching point, decides a tracking lane based on a prediction lane predicted from the previous driving lane and lane change determination upon deciding the matching lane, and decides a final driving lane based on the decided matching lane and the decided tracking lane.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF ILLUSTRATIVE EMBODIMENTS

Figure 1:
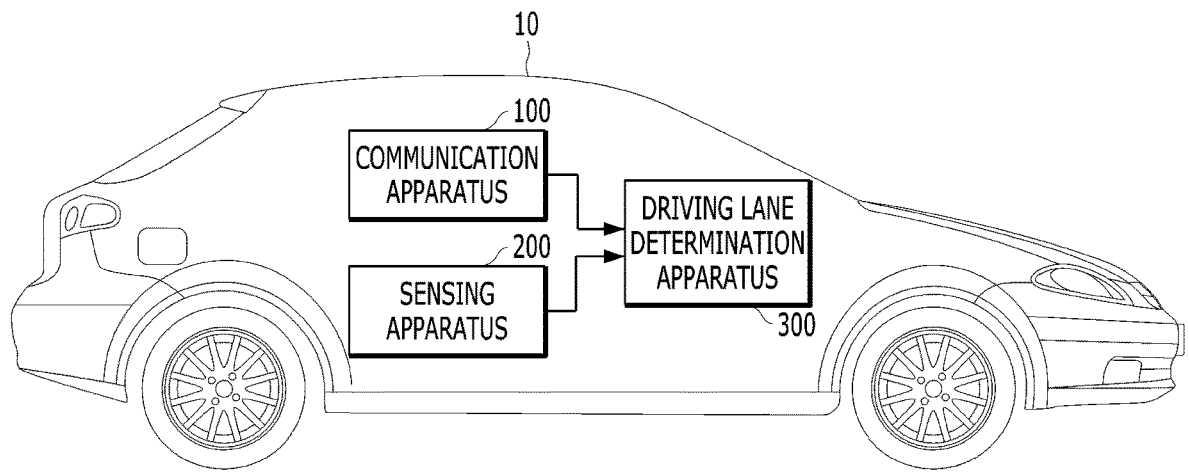
FIG. 1 is a view illustrating a vehicle to which a driving lane determination apparatus according to the present invention is applied.

Reference will now be made in detail to the preferred embodiments of the present invention, examples of which are illustrated in the accompanying drawings. The following embodiments are given by way of example in order to enable those skilled in the art to fully understand the idea of the present invention. Therefore, the present invention is not limited by the following embodiments, and may be realized in various other forms. In order to clearly describe the present invention, parts having no relation with the description of the present invention have been omitted from the drawings. Wherever possible, the same reference numerals will be used throughout the specification to refer to the same or like parts.

The term "comprises" or "includes" used herein should be interpreted not to exclude other elements but to further include such other elements, unless mentioned otherwise. In addition, the term "unit" or "module" used herein signifies one unit that processes at least one function or operation, and may be realized by hardware, software, or a combination thereof.

In addition, the same reference numerals denote the same constituent elements throughout the specification.

Hereinafter, a driving lane determination apparatus and a driving lane determination method thereof, which may be applied to embodiments of the present invention, will be described in detail with reference to FIGS. 1 to 12.

FIG. 1 is a view illustrating a vehicle to which a driving lane determination apparatus according to the present invention is applied.

As shown in FIG. 1, the vehicle 10 according to the present invention may include a communication apparatus 100 for receiving map information, a sensing apparatus 200 for sensing driving environment information of a host vehicle, and a driving lane determination apparatus 300 for determining a driving lane of the host vehicle based on the map information and the driving environment information.

Here, the driving lane determination apparatus 300 may decide whether to perform driving lane determination entry based on the map information and the driving environment information, may match the map information and the driving environment information to calculate a matching point of each lane upon deciding the driving lane determination entry, may decide a matching lane based on the calculated matching point, may decide a tracking lane based on a prediction lane predicted from the previous driving lane and lane change determination upon deciding the matching lane, and may decide a final driving lane based on the decided matching lane and the decided tracking lane.

At this time, the driving lane determination apparatus 300 may acquire map information including precise map information and global positioning system (GPS) information and driving environment information including host vehicle position information, stationary object information, moving object information, and lane division line information.

In addition, the driving lane determination apparatus 300 may analyze a driving road state based on the map information and the driving environment information, may determine whether the analyzed driving road state satisfies a predetermined condition, and may decide driving lane determination entry upon determining that the analyzed driving road state satisfies the predetermined condition.

Upon deciding the driving lane determination entry, the driving lane determination apparatus 300 may extract a precise map from the map information, may extract host vehicle position information, stationary object information, moving object information, and lane division line information from the driving environment information, and may match the host vehicle position information, the stationary object information, the moving object information, and the lane division line information with the precise map to calculate a matching point of each lane on the precise map.

In the case in which the host vehicle position is matched with any one of a plurality of lanes on the precise map, the driving lane determination apparatus 300 may extract stationary objects, moving objects, and lane division lines normally matched with the precise map, among stationary objects, moving objects, and lane division lines corresponding thereto, and may calculate a matching point of the lane in which the host vehicle is located based on the normally matched stationary objects, moving objects, and lane division lines.

In addition, when extracting each stationary object, the driving lane determination apparatus 300 may remove the stationary object in the case in which the length of the stationary object is shorter than a first predetermined length, and may divide the stationary object by a predetermined unit length in the case in which the length of the stationary object is longer than a second predetermined length.

When calculating the matching point of the lane in which the host vehicle is located, the driving lane determination apparatus 300 may give marks to the stationary objects, the moving objects, and the lane division lines normally matched with the precise map, and may calculate the matching point of the lane in which the host vehicle is located as the sum of the marks of the normally matched stationary objects, moving objects, and lane division lines.

Subsequently, the driving lane determination apparatus 300 may collect matching points of all lanes, may select a lane having the highest matching point, among the collected matching points, and may decide the selected lane as a matching lane.

Subsequently, the driving lane determination apparatus 300 may update the tracking lane based on the prediction lane predicted from the previous driving lane, or may update the tracking lane based on lane change determination from the previous driving lane.

The driving lane determination apparatus 300 may compare the matching point calculated from the matching lane and the matching point calculated from the tracking lane with each other, and may decide a lane having a higher matching point as a final driving lane.

In the present invention, therefore, it is possible to calculate a matching point of each lane utilizing precise map information and sensor fusion information and to decide a driving lane based on the calculated matching point, whereby it is possible to accurately determine the driving lane and evaluate precise positioning reliability based thereon.

Also, in the present invention, precise road shape data are used with respect to a driving environment, and therefore reliability is high.

That is, in the present invention, it is possible to calculate a region in which stationary objects and moving objects may be included utilizing a precise map including information about lanes, lane division lines, and geographic features outside the lanes and to perform matching with camera sensor data utilizing a precise map including lane division line attribute information.

Also, in the present invention, it is possible to use the result of driving lane determination and a value of the matching point of each lane in a fail-safe system for determining reliability of precise positioning result.

Also, in the present invention, it is possible to enlarge a region in which driving lane determination logic is capable of being operated.

That is, the present invention may be utilized on a crowded road, such as a superhighway, a divergence road, a merging road, or an intersection, and may be applied to a new road, a painted road, or a road under construction.

Figure 2:
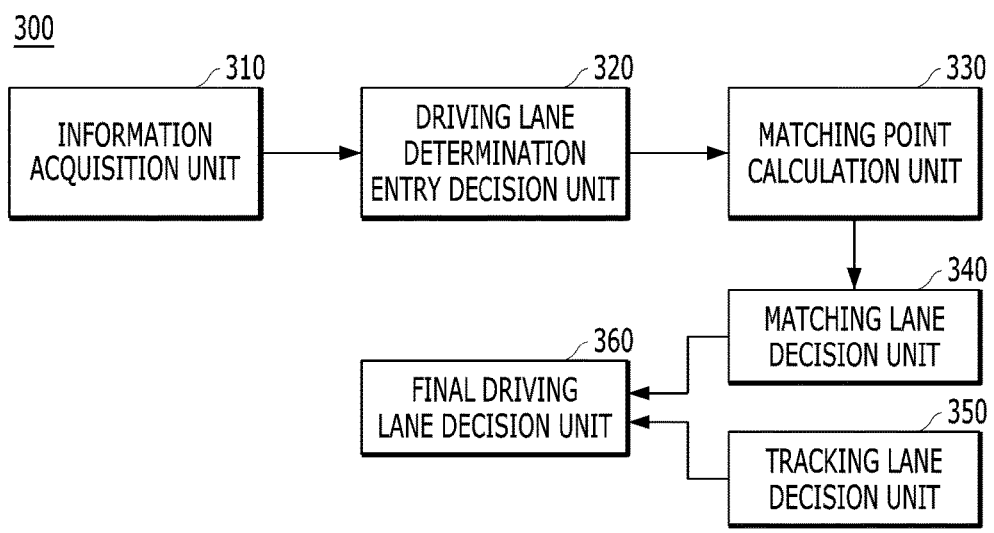
FIG. 2 is a block diagram illustrating the driving lane determination apparatus according to the present invention.

FIG. 2 is a block diagram illustrating the driving lane determination apparatus according to the present invention.

As shown in FIG. 2, the driving lane determination apparatus 300 may include an information acquisition unit 310 for acquiring map information and driving environment information, a driving lane determination entry decision unit 320 for deciding whether to perform driving lane determination entry based on the map information and the driving environment information, a matching point calculation unit 330 for matching the map information and the driving environment information to calculate a matching point of each lane upon deciding the driving lane determination entry, a matching lane decision unit 340 for deciding a matching lane based on the calculated matching point, a tracking lane decision unit 350 for deciding a tracking lane based on a prediction lane predicted from the previous driving lane and lane change determination upon deciding the matching lane, and a final driving lane decision unit 360 for deciding a final driving lane based on the decided matching lane and the decided tracking lane.

Here, the information acquisition unit 310 may acquire map information including precise map information and global positioning system (GPS) information and driving environment information including host vehicle position information, stationary object information, moving object information, and lane division line information. However, the present invention is not limited thereto.

The driving lane determination entry decision unit 320 may analyze a driving road state based on the map information and the driving environment information, may determine whether the analyzed driving road state satisfies a predetermined condition, and may decide driving lane determination entry upon determining that the analyzed driving road state satisfies the predetermined condition.

As an example, the driving lane determination entry decision unit 320 may decide driving lane determination entry upon determining that the driving road state satisfies a predetermined condition including a superhighway, a divergence road, a merging road, and an intersection. However, the present invention is not limited thereto.

In addition, the driving lane determination entry decision unit 320 may analyze a driving road state based on the map information, may determine whether the analyzed driving road state satisfies a first predetermined condition, may decide driving lane determination entry upon determining that the analyzed driving road state satisfies the first predetermined condition, may analyze the driving road state based on the driving environment information upon determining that the analyzed driving road state does not satisfy the first predetermined condition, may determine whether the analyzed driving road state satisfies a second predetermined condition, and may decide driving lane determination entry upon determining that the analyzed driving road state satisfies the second predetermined condition.

For example, the driving lane determination entry decision unit 320 may decide driving lane determination entry upon determining that the driving road state satisfies a first predetermined condition including a superhighway, a divergence road, a merging road, and an intersection, or may decide driving lane determination entry upon determining that the driving road state satisfies a second predetermined condition including a new road, a painted road, or a road under construction.

Depending on circumstances, the driving lane determination entry decision unit 320 may analyze a driving road state, a precise map state, and a camera state based on the map information and the driving environment information, may determine whether the analyzed driving road state, precise map state, and camera state satisfy a predetermined condition, and may decide driving lane determination entry upon determining that the analyzed driving road state satisfies the predetermined condition.

For example, the driving lane determination entry decision unit 320 may decide driving lane determination entry upon determining that the driving road state satisfies a first predetermined condition including a superhighway, a divergence road, a merging road, and an intersection, the precise map state satisfies a second predetermined condition as a normal precise map, and the camera state satisfies a third predetermined condition as a normal camera.

Upon deciding the driving lane determination entry, the matching point calculation unit 330 may extract a precise map from the map information, may extract host vehicle position information, stationary object information, moving object information, and lane division line information from the driving environment information, and may match the host vehicle position information, the stationary object information, the moving object information, and the lane division line information with the precise map to calculate a matching point of each lane on the precise map.

In the case in which the host vehicle position is matched with any one of a plurality of lanes on the precise map, the matching point calculation unit 330 may extract stationary objects, moving objects, and lane division lines normally matched with the precise map, among stationary objects, moving objects, and lane division lines corresponding thereto, and may calculate a matching point of the lane in which the host vehicle is located based on the normally matched stationary objects, moving objects, and lane division lines.

When extracting the normally matched stationary objects, the matching point calculation unit 330 may recognize stationary objects partially or completely overlapping geographic features outside the lanes on the precise map to be normally matched.

When extracting each stationary object, the matching point calculation unit 330 may remove the stationary object in the case in which the length of the stationary object is shorter than a first predetermined length, and may divide the stationary object by a predetermined unit length in the case in which the length of the stationary object is longer than a second predetermined length.

For example, the first predetermined length may be about 5 m, the second predetermined length may be about 15 m, and the predetermined unit length may be about 1 m. However, the present invention is not limited thereto.

In addition, when extracting the normally matched stationary objects, the matching point calculation unit 330 may recognize moving objects partially or completely overlapping the lanes on the precise map to be normally matched.

Subsequently, when extracting the normally matched lane division lines, the matching point calculation unit 330 may recognize lane division lines located between the lanes on the precise map to be normally matched.

In addition, when calculating the matching point of the lane in which the host vehicle is located, the matching point calculation unit 330 may calculate the number of stationary objects, moving objects, and lane division lines normally matched with the precise map, and may calculate the matching point of the lane in which the host vehicle is located as the sum of the number of the normally matched stationary objects, moving objects, and lane division lines.

Depending on circumstances, when calculating the matching point of the lane in which the host vehicle is located, the matching point calculation unit 330 may give marks to the stationary objects, the moving objects, and the lane division lines normally matched with the precise map, and may calculate the matching point of the lane in which the host vehicle is located as the sum of the marks of the normally matched stationary objects, moving objects, and lane division lines.

As another case, when calculating the matching point of the lane in which the host vehicle is located, the matching point calculation unit 330 may calculate the degree of matching of the stationary objects, the moving objects, and the lane division lines normally matched with the precise map, and may give marks to the calculated degree of matching to calculate the matching point of the lane in which the host vehicle is located.

Here, when calculating the degree of matching, the matching point calculation unit 330 may calculate the degree of matching based on the overlapping area of the stationary objects and the geographic features outside the lanes on the precise map, the overlapping area of the moving objects and the lanes on the precise map, and the distance between each lane division line and the center line between the respective lanes on the precise map.

For example, in the case in which the overlapping area of the stationary objects and the geographic features outside the lanes on the precise map is larger, the overlapping area of the moving objects and the lanes on the precise map is larger, and the distance between each lane division line and the center line between the respective lanes on the precise map is smaller, the degree of matching may increase.

Subsequently, the matching lane decision unit 340 may collect matching points of all lanes, may select a lane having the highest matching point, among the collected matching points, and may decide the selected lane as a matching lane.

Subsequently, the tracking lane decision unit 350 may update the tracking lane based on the prediction lane predicted from the previous driving lane, or may update the tracking lane based on lane change determination from the previous driving lane.

When updating the tracking lane based on the prediction lane, upon determining that the next lane of the current driving lane from the map information is a connection lane in which a new lane is connected to the current driving lane, the tracking lane decision unit 350 may predict whether the host vehicle will enter the new lane from the connection lane to update the tracking lane.

Depending on circumstances, when updating the tracking lane based on the prediction lane, upon determining that the next lane of the current driving lane from the map information is an extension lane in which the current driving lane extends to a plurality of lanes, the tracking lane decision unit 350 may predict the driving path of the host vehicle on the extension lane to update the tracking lane.

As another case, when updating the tracking lane based on the prediction lane, upon determining that the next lane of the current driving lane from the map information is a divergence lane, the tracking lane decision unit 350 may predict the driving position of the host vehicle in the divergence lane to update the tracking lane.

In addition, when updating the tracking lane based on the lane change determination, the tracking lane decision unit 350 may determine lane change in the case in which the host vehicle passes over the left lane division line or the right lane division line based on the driving state of the host vehicle, and may update the tracking lane based on the lane change.

When determining the lane change, the tracking lane decision unit 350 may determine the lane change in the case in which a half or more of the host vehicle passes over a lane division line.

Subsequently, the final driving lane decision unit 360 may compare the matching point calculated from the matching lane and the matching point calculated from the tracking lane with each other, and may decide a lane having a higher matching point as a final driving lane.

In the case in which the matching point of the matching lane is higher than the matching point of the tracking lane as the result of matching point comparison, the final driving lane decision unit 360 may decide the matching lane as a final driving lane.

Depending on circumstances, in the case in which the matching point of the tracking lane is higher than the matching point of the matching lane as the result of matching point comparison, the final driving lane decision unit 360 may decide the tracking lane as a final driving lane.

FIGS. 3 to 9 are views illustrating a matching point calculation process according to the present invention.

Figure 3:
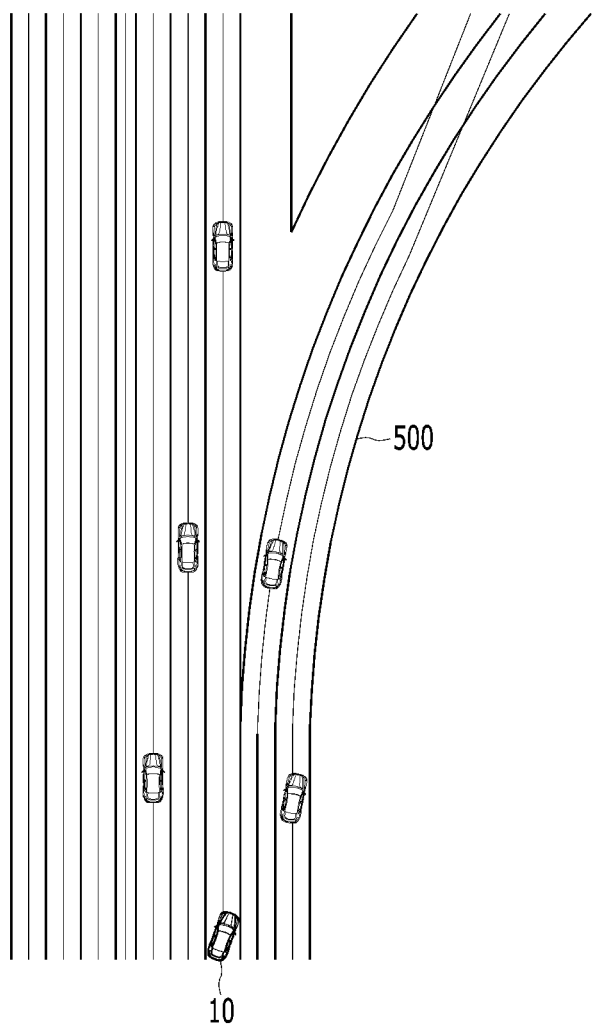
FIGS. 3 to 9 are views illustrating a matching point calculation process according to the present invention.
Figure 4:
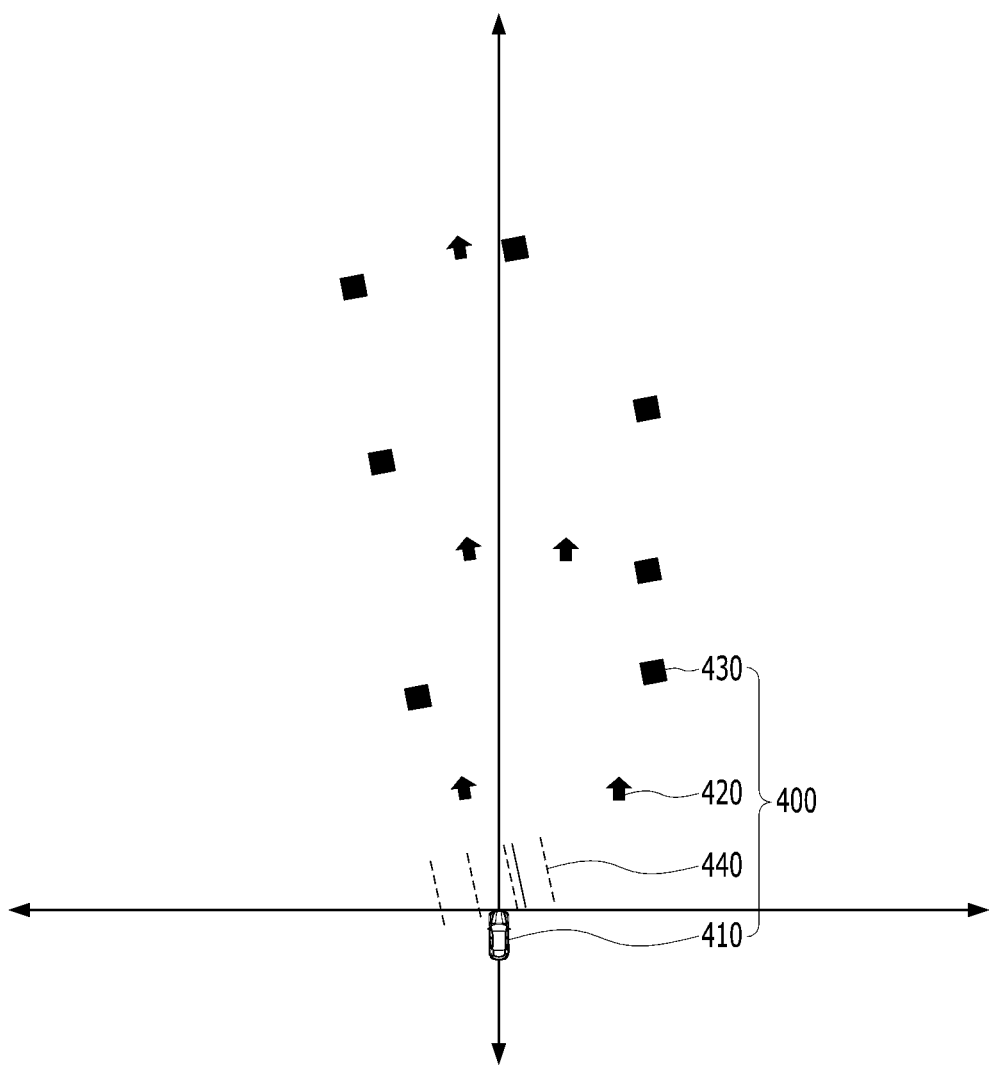

As shown in FIGS. 3 and 4, the driving lane determination apparatus according to the present invention may acquire map information 500 including precise map information and global positioning system (GPS) information and driving environment information 400 including host vehicle position information 410, stationary object information 430, moving object information 420, and lane division line information 440 to decide whether to perform driving lane determination logic entry.

Subsequently, as shown in FIGS. 5 to 9, upon deciding the driving lane determination logic entry, the present invention may extract a precise map including lanes and geographic features 520 outside the lanes from the map information 500, may extract the host vehicle position information 410, the stationary object information 430, the moving object information 420, and the lane division line information 440 from the driving environment information 400, and may match the host vehicle position information, the stationary object information, the moving object information 420, and the lane division line information 440 with the precise map to calculate a matching point 600 of each lane on the precise map.

Figure 5:
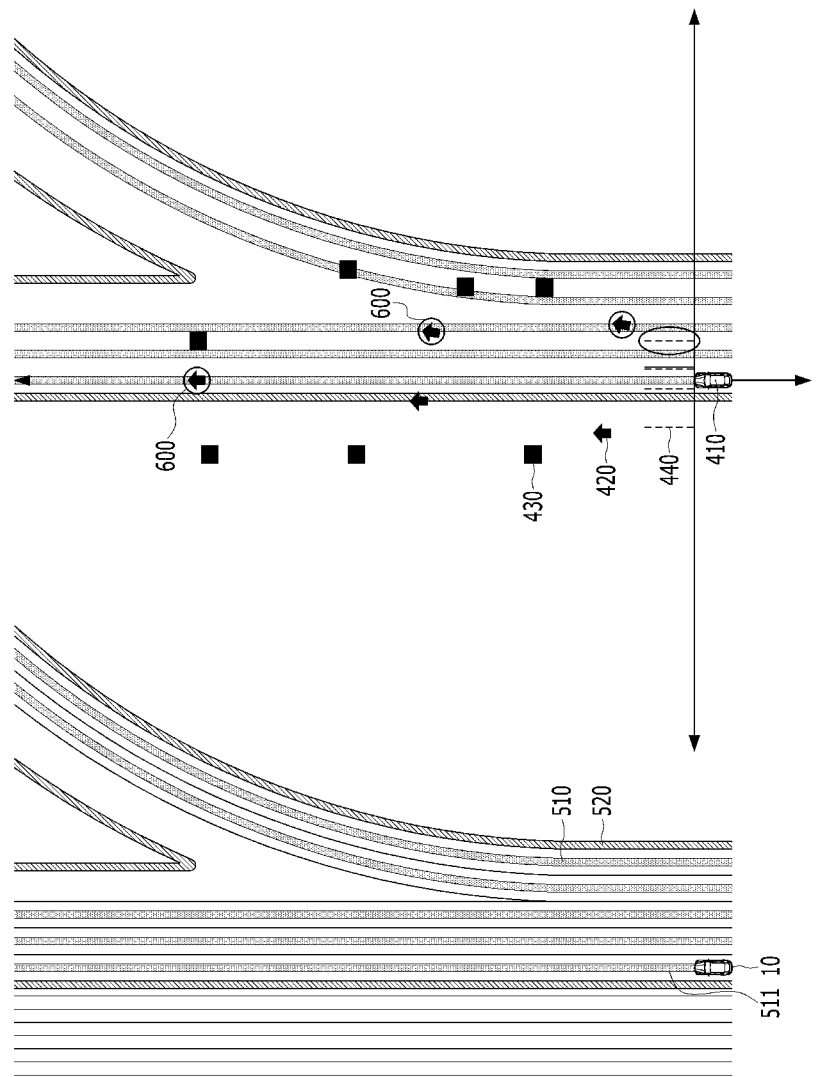

As shown in FIG. 5, in the case in which the host vehicle position information 410 is matched with a first lane 511, among a plurality of lanes 510 on the precise map, the present invention may extract stationary objects, moving objects, and lane division lines normally matched (600) with the precise map, among the stationary object information 430, the moving object information 420, and the lane division line information 440 corresponding thereto, and may calculate a matching point of the first lane 511 in which the host vehicle 10 is located based on the normally matched (600) stationary objects, moving objects, and lane division lines.

Here, the present invention may recognize the stationary object information 430 partially or completely overlapping the geographic features 520 outside the lanes on the precise map to be normally matched (600), may recognize the moving object information 420 partially or completely overlapping the lanes 510 on the precise map to be normally matched (600), and may recognize the lane division line information 440 located between the lanes 510 on the precise map to be normally matched (600).

In the present invention, therefore, three pieces of moving object information 420 may be recognized to be normally matched (600), and one piece of lane division line information 440 may be recognized to be normally matched (600), in FIG. 5.

Figure 6:
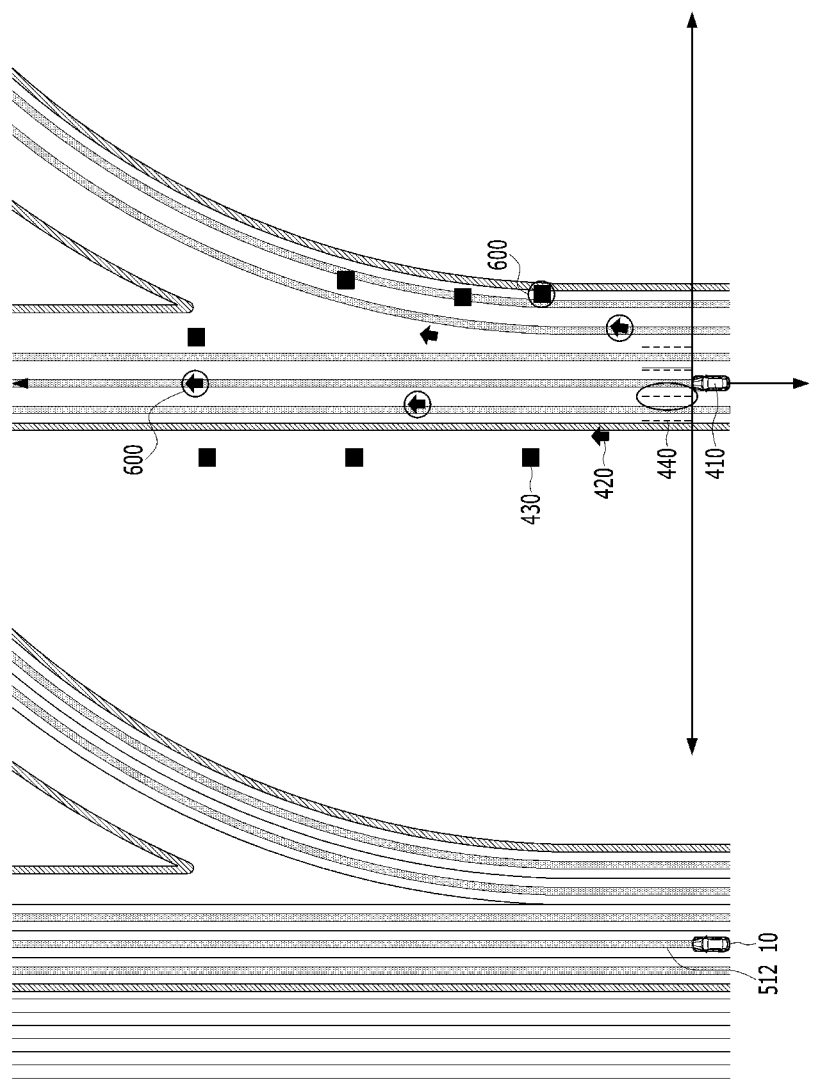

Subsequently, as shown in FIG. 6, in the case in which the host vehicle position information 410 is matched with a second lane 512, among the plurality of lanes 510 on the precise map, the present invention may extract stationary objects, moving objects, and lane division lines normally matched (600) with the precise map, among the stationary object information 430, the moving object information 420, and the lane division line information 440 corresponding thereto, and may calculate a matching point of the second lane 512 in which the host vehicle 10 is located based on the normally matched (600) stationary objects, moving objects, and lane division lines.

Here, in the present invention, one piece of stationary object information 430 may be recognized to be normally matched (600), three pieces of moving object information 420 may be recognized to be normally matched (600), and one piece of lane division line information 440 may be recognized to be normally matched (600), in FIG. 6.

Figure 7:
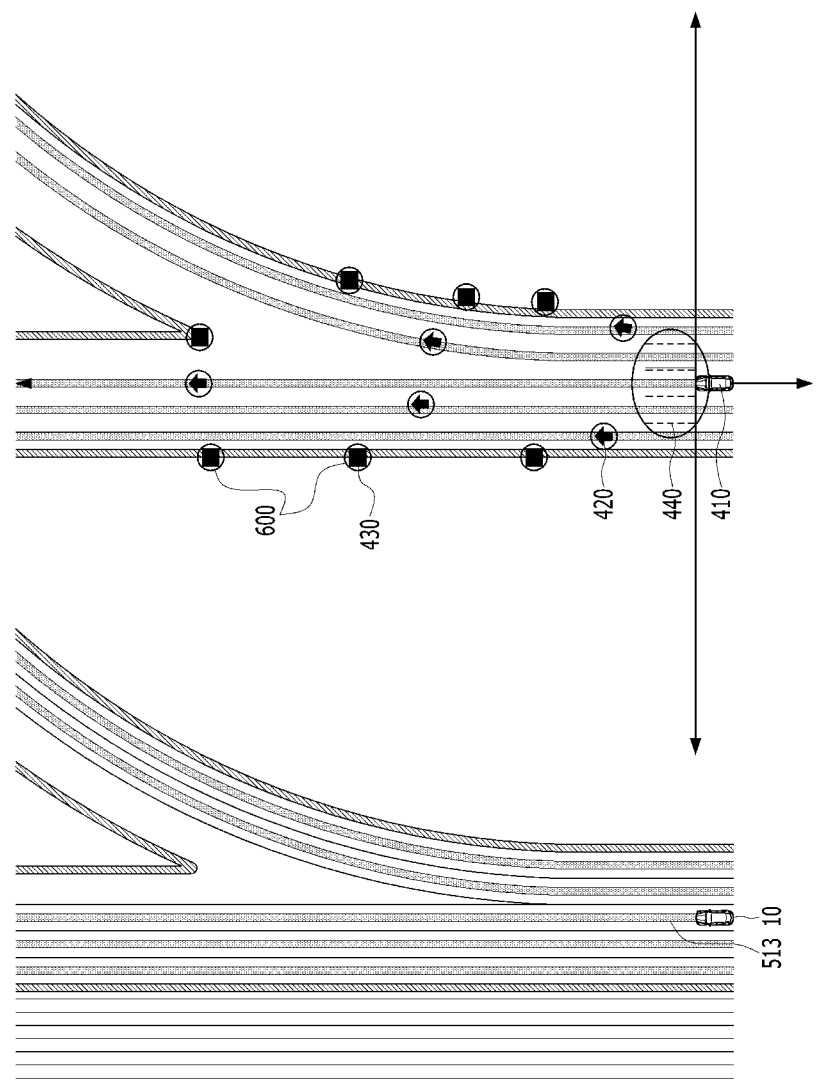

Subsequently, as shown in FIG. 7, in the case in which the host vehicle position information 410 is matched with a third lane 513, among the plurality of lanes 510 on the precise map, the present invention may extract stationary objects, moving objects, and lane division lines normally matched (600) with the precise map, among the stationary object information 430, the moving object information 420, and the lane division line information 440 corresponding thereto, and may calculate a matching point 600 of the third lane 513 in which the host vehicle 10 is located based on the normally matched (600) stationary objects, moving objects, and lane division lines.

Here, in the present invention, seven pieces of stationary object information 430 may be recognized to be normally matched (600), five pieces of moving object information 420 may be recognized to be normally matched (600), and four pieces of lane division line information 440 may be recognized to be normally matched (600), in FIG. 7.

Figure 8:
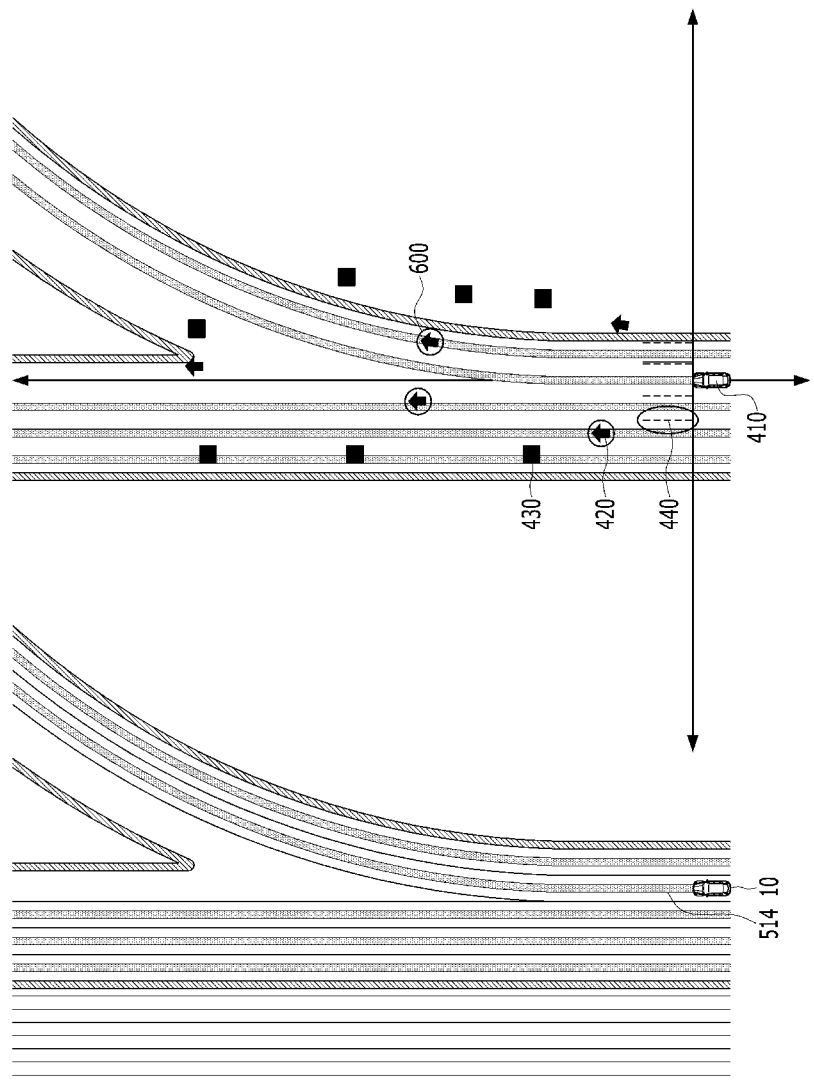

Subsequently, as shown in FIG. 8, in the case in which the host vehicle position information 410 is matched with a fourth lane 514, among the plurality of lanes 510 on the precise map, the present invention may extract stationary objects, moving objects, and lane division lines normally matched (600) with the precise map, among the stationary object information 430, the moving object information 420, and the lane division line information 440 corresponding thereto, and may calculate a matching point 600 of the fourth lane 514 in which the host vehicle 10 is located based on the normally matched (600) stationary objects, moving objects, and lane division lines.

Here, in the present invention, thee pieces of moving object information 420 may be recognized to be normally matched (600), and one piece of lane division line information 440 may be recognized to be normally matched (600), in FIG. 8.

Figure 9:
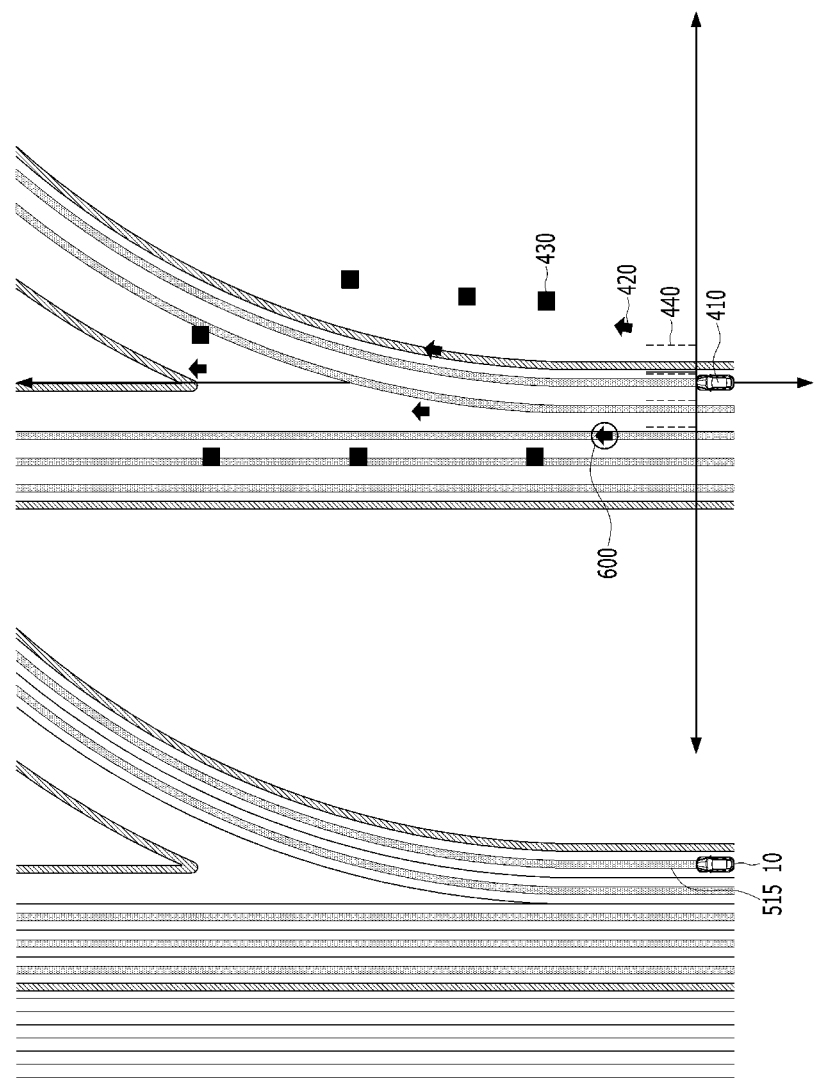

Subsequently, as shown in FIG. 9, in the case in which the host vehicle position information 410 is matched with a fifth lane 515, among the plurality of lanes 510 on the precise map, the present invention may extract stationary objects, moving objects, and lane division lines normally matched (600) with the precise map, among the stationary object information 430, the moving object information 420, and the lane division line information 440 corresponding thereto, and may calculate a matching point 600 of the fifth lane 515 on which the host vehicle 10 is located based on the normally matched (600) stationary objects, moving objects, and lane division lines.

Here, in the present invention, one piece of moving object information 420 may be recognized to be normally matched (600) in FIG. 9.

Consequently, the present invention may calculate the number of stationary objects, moving objects, and lane division lines normally matched (600) with the precise map, and may calculate the matching point of the lane in which the host vehicle is located as the sum of the number of the normally matched (600) stationary objects, moving objects, and lane division lines.

For example, the matching point of the first lane 511 may be 4, the matching point of the second lane 512 may be 5, the matching point of the third lane 513 may be 16, the matching point of the fourth lane 514 may be 4, and the matching point of the fifth lane 515 may be 1.

Depending on circumstances, the present invention may give marks to the stationary objects, the moving objects, and the lane division lines normally matched (600) with the precise map, and may calculate the matching point of the lane in which the host vehicle is located as the sum of the marks of the normally matched (600) stationary objects, moving objects, and lane division lines.

As another case, the present invention may calculate the degree of matching of the stationary objects, the moving objects, and the lane division lines normally matched (600) with the precise map, and may give marks to the calculated degree of matching to calculate the matching point of the lane in which the host vehicle is located.

Here, the present invention may calculate the degree of matching based on the overlapping area of the stationary objects 430 and the geographic features 520 outside the lanes on the precise map, the overlapping area of the moving objects 420 and the lanes 510 on the precise map, and the distance between each lane division line 440 and the center line between the respective lanes 510 on the precise map.

For example, in the present invention, the degree of matching may increase in the case in which the overlapping area of the stationary objects 430 and the geographic features 520 outside the lanes on the precise map is larger, the overlapping area of the moving objects 420 and the lanes 510 on the precise map is larger, and the distance between each lane division line 440 and the center line between the respective lanes 510 on the precise map is smaller.

Consequently, the present invention may collect matching points of the first to fifth lanes 511 to 515, select the third lane 513 having the highest matching points, among the collected matching points, and may decide the selected third lane 513 as a matching lane.

Figure 10A:
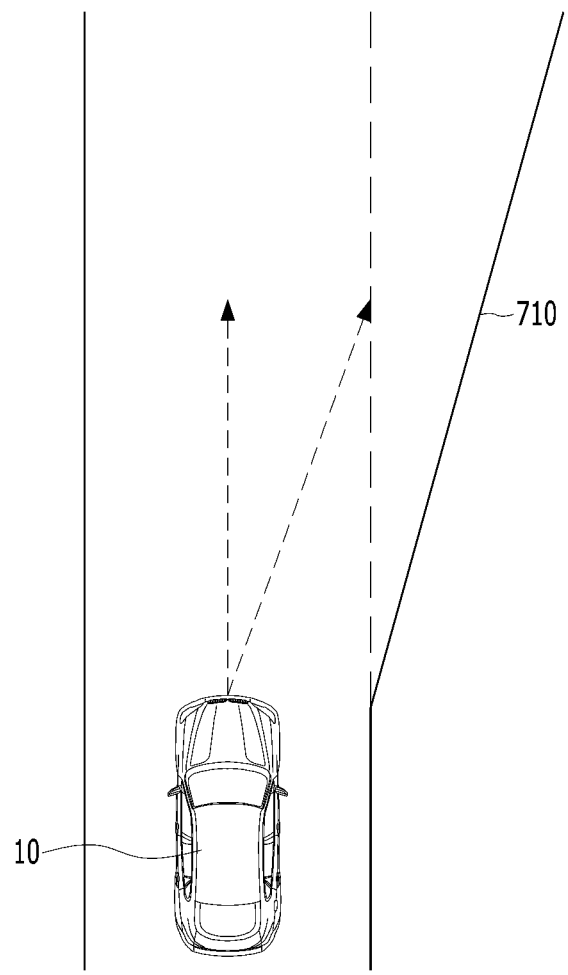
FIGS. 10A to 10C are views illustrating a prediction lane determination process for tracking lane decision according to the present invention.
Figure 10B:
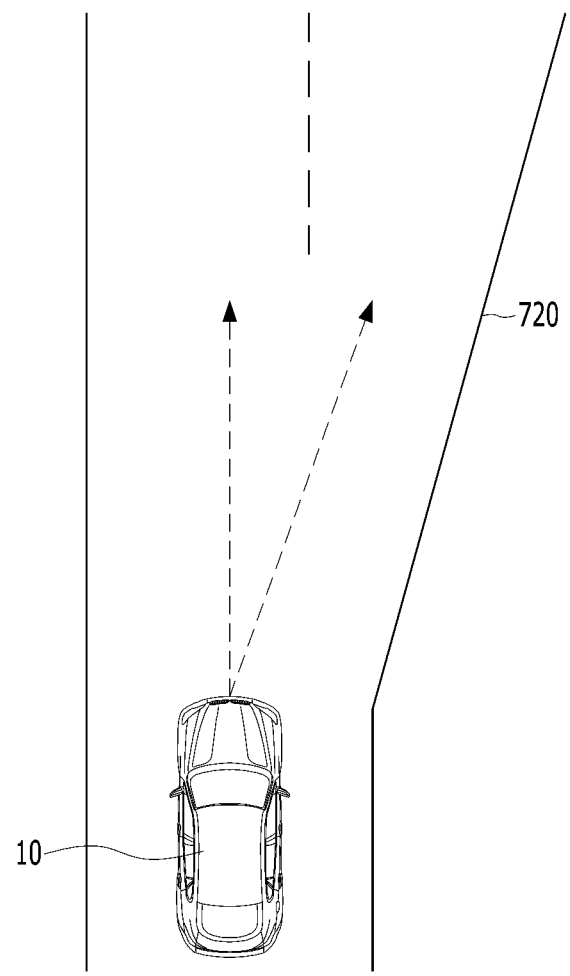
Figure 10C:
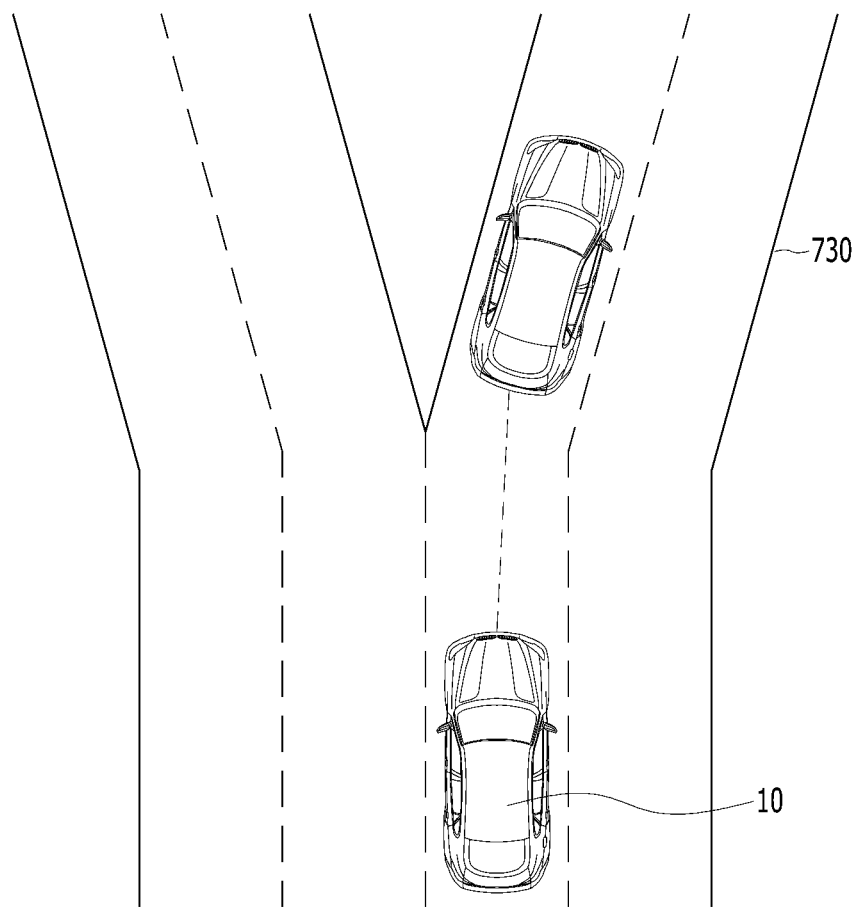

FIGS. 10A to 10C are views illustrating a prediction lane determination process for tracking lane decision according to the present invention.

As shown in FIGS. 10A to 10C, the present invention may decide a tracking lane based on a prediction lane predicted from the previous driving lane upon deciding the matching lane.

Here, the present invention may update the tracking lane based on the prediction lane predicted from the previous driving lane.

As shown in FIG. 10A, in the case in which the next lane of the current driving lane from the map information is a connection lane 710 in which a new lane is connected to the current driving lane, the present invention may predict whether the host vehicle 10 will enter the new lane from the connection lane 710 to update the tracking lane.

Depending on circumstances, in the case in which the next lane of the current driving lane from the map information is an extension lane 720 in which the current driving lane extends to a plurality of lanes, as shown in FIG. 10B, the present invention may predict the driving path of the host vehicle 10 in the extension lane 720 to update the tracking lane.

As another case, in the case in which the next lane of the current driving lane from the map information is a divergence lane 730, as shown in FIG. 10C, the present invention may predict the driving position of the host vehicle in the divergence lane 730 to update the tracking lane.

Figure 11A:
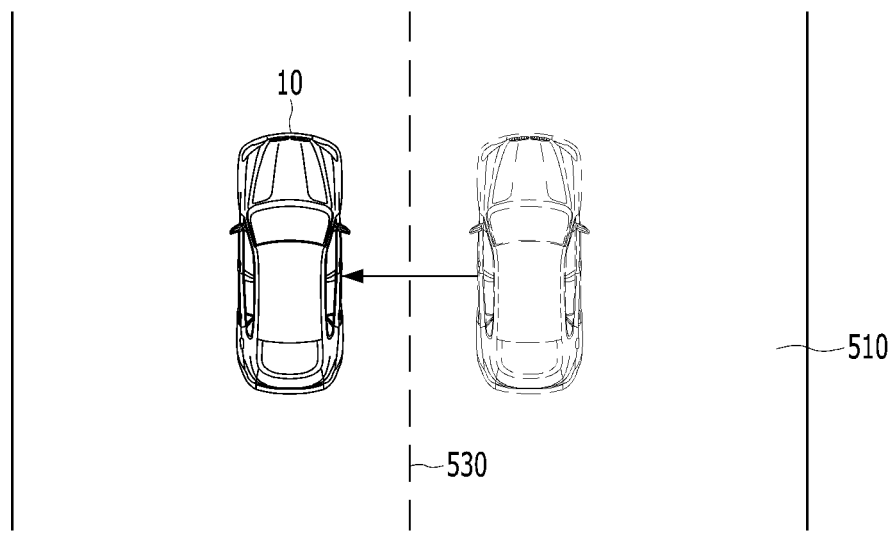
FIGS. 11A and 11B are views illustrating a lane change determination process for tracking lane decision according to the present invention.
Figure 11B:
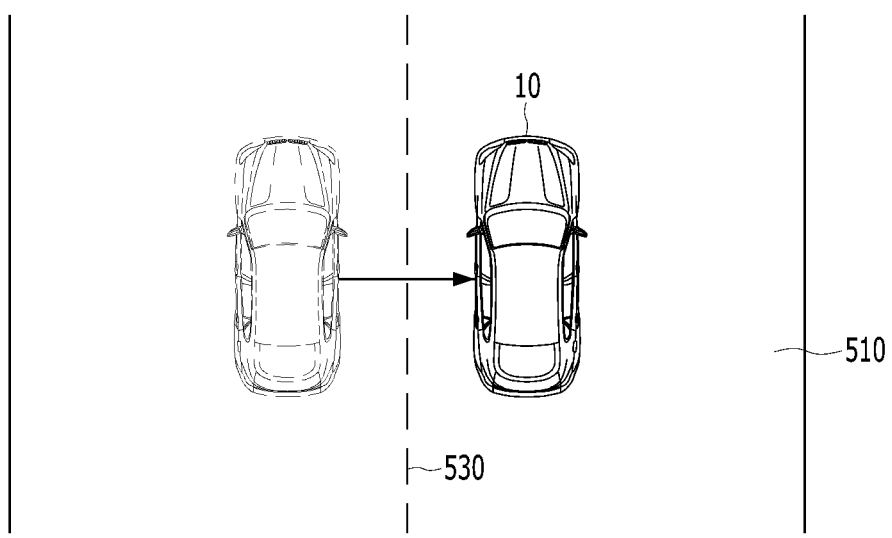

FIGS. 11A and 11B are views illustrating a lane change determination process for tracking lane decision according to the present invention.

As shown in FIGS. 11A and 11B, the present invention may decide a tracking lane based on lane change determination from the previous driving lane upon deciding the matching lane.

Here, the present invention may update the tracking lane based on the lane change determination from the previous driving lane.

As shown in FIG. 11A, the present invention may determine lane change in the case in which the host vehicle 10 passes over a left lane division line 530 of the lane 510 based on the driving state of the host vehicle, and may update the tracking lane based on the lane change.

In addition, as shown in FIG. 11B, the present invention may determine lane change in the case in which the host vehicle 10 passes over a right lane division line 530 of the lane 510 based on the driving state of the host vehicle, and may update the tracking lane based on the lane change.

When determining the lane change, the present invention may determine the lane change in the case in which a half or more of the host vehicle 10 passes over the lane division line 530.

Figure 12:
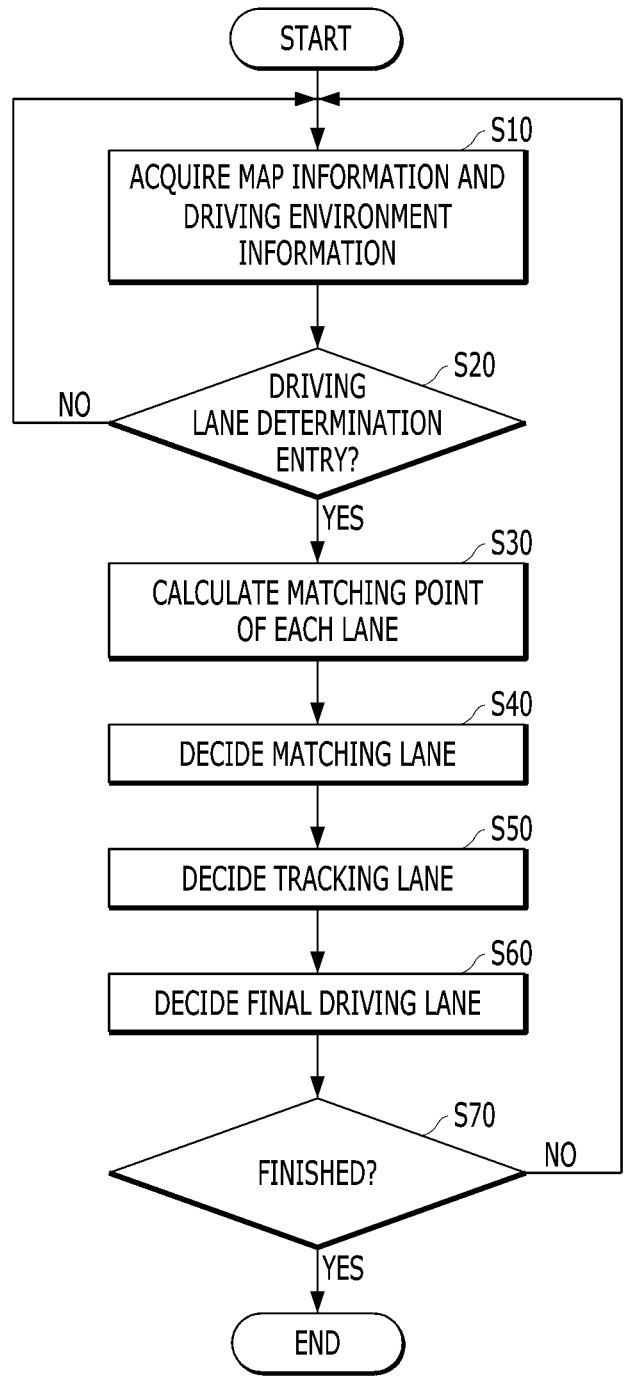
FIG. 12 is a flowchart illustrating a driving lane determination method of the driving lane determination apparatus according to the present invention.

FIG. 12 is a flowchart illustrating a driving lane determination method of the driving lane determination apparatus according to the present invention.

As shown in FIG. 12, the present invention may acquire map information and driving environment information (S10).

Here, the present invention may acquire map information including precise map information and GPS information and driving environment information including host vehicle position information, stationary object information, moving object information, and lane division line information.

Subsequently, the present invention may decide whether to perform driving lane determination entry based on the map information and the driving environment information (S20).

Here, the present invention may analyze a driving road state based on the map information and the driving environment information, may determine whether the analyzed driving road state satisfies a predetermined condition, and may decide driving lane determination entry upon determining that the analyzed driving road state satisfies the predetermined condition.

Depending on circumstances, the present invention may analyze a driving road state based on the map information, may determine whether the analyzed driving road state satisfies a first predetermined condition, may decide driving lane determination entry upon determining that the analyzed driving road state satisfies the first predetermined condition, may analyze the driving road state based on the driving environment information upon determining that the analyzed driving road state does not satisfy the first predetermined condition, may determine whether the analyzed driving road state satisfies a second predetermined condition, and may decide driving lane determination entry upon determining that the analyzed driving road state satisfies the second predetermined condition.

As another case, the present invention may analyze a driving road state, a precise map state, and a camera state based on the map information and the driving environment information, may determine whether the analyzed driving road state, precise map state, and camera state satisfy a predetermined condition, and may decide driving lane determination entry upon determining that the analyzed driving road state satisfies the predetermined condition.

Upon deciding the driving lane determination entry, the present invention may match the map information and the driving environment information to calculate a matching point of each lane (S30).

Upon deciding the driving lane determination entry, the present invention may extract a precise map from the map information, may extract host vehicle position information, stationary object information, moving object information, and lane division line information from the driving environment information, and may match the host vehicle position information, the stationary object information, the moving object information, and the lane division line information with the precise map to calculate a matching point of each lane on the precise map.

As an example, in the case in which the host vehicle position is matched with any one of a plurality of lanes on the precise map, the present invention may extract stationary objects, moving objects, and lane division lines normally matched with the precise map, among stationary objects, moving objects, and lane division lines corresponding thereto, and may calculate a matching point of the lane in which the host vehicle is located based on the normally matched stationary objects, moving objects, and lane division lines.

Subsequently, the present invention may decide a matching lane based on the calculated matching point (S40).

Here, the present invention may collect matching points of all lanes, may select a lane having the highest matching points, among the collected matching points, and may decide the selected lane as a matching lane.

Upon deciding the matching lane, the present invention may decide a tracking lane based on a prediction lane predicted from the previous driving lane and lane change determination (S50).

Here, the present invention may update the tracking lane based on the prediction lane predicted from the previous driving lane, or may update the tracking lane based on lane change determination from the previous driving lane.

Subsequently, the present invention may decide a final driving lane based on the decided matching lane and the decided tracking lane (S60).

Here, the present invention may compare the matching point calculated from the matching lane and the matching point calculated from the tracking lane with each other, and may decide a lane having a higher matching point as a final driving lane.

Subsequently, the present invention may check whether there is a request for finishing driving lane determination logic (S70), and may finish the driving lane determination logic upon checking that there is the request for finishing the driving lane determination logic.

In the present invention, therefore, it is possible to calculate a matching point of each lane utilizing precise map information and sensor fusion information and to decide a driving lane based on the calculated matching point, whereby it is possible to accurately determine the driving lane and evaluate precise positioning reliability based thereon.

Also, in the present invention, precise road shape data are used with respect to a driving environment, and therefore reliability is high.

That is, in the present invention, it is possible to calculate a region in which stationary objects and moving objects may be included utilizing a precise map including information about lanes, lane division lines, and geographic features outside the lanes and to perform matching with camera sensor data utilizing a precise map including lane division line attribute information.

Also, in the present invention, it is possible to use the result of driving lane determination and a value of the matching point of each lane in a fail-safe system for determining reliability of precise positioning result.

Also, in the present invention, it is possible to enlarge a region in which driving lane determination logic is capable of being operated.

That is, the present invention may be utilized in a crowded road, such as a superhighway, a divergence road, a merging road, or an intersection, and may be applied to a new road, a painted road, or a road under construction.

In addition, a computer-readable recording medium containing a program for performing the driving lane determination method of the driving lane determination apparatus according to the present invention may execute the processes included in the driving lane determination method.

The driving lane determination method according to the present invention described above may be implemented as a computer-readable program stored in a computer-readable recording medium. The computer-readable medium may be any type of recording device in which data is stored in a computer-readable manner. The computer-readable medium may include, for example, a hard disk drive (HDD), a solid-state disk (SSD), a silicon disk drive (SDD), a read-only memory (ROM), a random access memory (RAM), a compact disc read-only memory (CD-ROM), a magnetic tape, a floppy disk, and an optical data storage device.

In the driving lane determination apparatus and the driving lane determination method thereof according to at least one embodiment of the present invention, constructed as described above, it is possible to calculate a matching point of each lane utilizing precise map information and sensor fusion information and to decide a driving lane based on the calculated matching point, whereby it is possible to accurately determine the driving lane and evaluate precise positioning reliability based thereon.

Also, in the present invention, precise road shape data are used with respect to a driving environment, and therefore reliability is high.

That is, in the present invention, it is possible to calculate a region in which stationary objects and moving objects may be included utilizing a precise map including information about lanes, lane division lines, and geographic features outside the lanes and to perform matching with camera sensor data utilizing a precise map including lane division line attribute information.

Also, in the present invention, it is possible to use the result of driving lane determination and a value of the matching point of each lane in a fail-safe system for determining reliability of precise positioning result.

Also, in the present invention, it is possible to enlarge a region in which driving lane determination logic is capable of being operated.

That is, the present invention may be utilized in a crowded road, such as a superhighway, a divergence road, a merging road, or an intersection, and may be applied to a new road, a painted road, or a road under construction.

It will be appreciated by those skilled in the art that the effects achievable through the present invention are not limited to those that have been particularly described hereinabove and that other effects of the present invention will be more clearly understood from the above detailed description.

The above detailed description is not to be construed as limiting the present invention in any aspect, but is to be considered by way of example. The scope of the present invention should be determined by reasonable interpretation of the accompanying claims, and all equivalent modifications made without departing from the scope of the present invention should be understood as being included in the following claims.

What is claimed is:

1. A driving lane determination apparatus comprising:
an information acquisition unit configured to acquire map information and driving environment information;
a driving lane determination entry decision unit configured to decide whether to perform driving lane determination entry based on the map information and the driving environment information;
a matching point calculation unit configured to match the map information and the driving environment information to calculate a matching point of each lane upon deciding the driving lane determination entry;
a matching lane decision unit configured to decide a matching lane based on the calculated matching point;
a tracking lane decision unit configured to decide a tracking lane based on a prediction lane predicted from a previous driving lane and lane change determination upon deciding the matching lane; and a final driving lane decision unit configured to decide a final driving lane based on the decided matching lane and the decided tracking lane, wherein the information acquisition unit is configured to acquire map information comprising precise map information and global positioning system (GPS) information and driving environment information comprising host vehicle position information, stationary object information, moving object information, and lane division line information.

2. The driving lane determination apparatus according to claim 1, wherein the driving lane determination entry decision unit is configured to analyze a driving road state based on the map information and the driving environment information, to determine whether the analyzed driving road state satisfies a predetermined condition, and to decide the driving lane determination entry upon determining that the analyzed driving road state satisfies the predetermined condition.

3. The driving lane determination apparatus according to claim 1, wherein, upon deciding the driving lane determination entry, the matching point calculation unit is configured to extract a precise map from the map information, to extract host vehicle position information, stationary object information, moving object information, and lane division line information from the driving environment information, and to match the host vehicle position information, the stationary object information, the moving object information, and the lane division line information with the precise map to calculate a matching point of each lane on the precise map.

4. The driving lane determination apparatus according to claim 3, wherein, when calculating the matching point, in a case in which a host vehicle position is matched with any one of a plurality of lanes on the precise map, the matching point calculation unit is configured to extract stationary objects, moving objects, and lane division lines normally matched with the precise map, among stationary objects, moving objects, and lane division lines corresponding thereto, and to calculate a matching point of a lane in which the host vehicle is located based on the normally matched stationary objects, moving objects, and lane division lines.

5. The driving lane determination apparatus according to claim 4, wherein, when extracting each stationary object, the matching point calculation unit is configured to remove the stationary object when a length of the stationary object is shorter than a first predetermined length, and to divide the stationary object by a predetermined unit length when the length of the stationary object is longer than a second predetermined length.

6. The driving lane determination apparatus according to claim 4, wherein, when calculating the matching point of the lane in which the host vehicle is located, the matching point calculation unit is configured to give marks to the stationary objects, the moving objects, and the lane division lines normally matched with the precise map, and to calculate the matching point of the lane in which the host vehicle is located as a sum of the marks of the normally matched stationary objects, moving objects, and lane division lines.

7. The driving lane determination apparatus according to claim 1, wherein the matching lane decision unit is configured to collect matching points of all lanes, to select a lane having a highest matching point among the collected matching points, and to decide the selected lane as a matching lane.

8. The driving lane determination apparatus according to claim 1, wherein the tracking lane decision unit is configured to update the tracking lane based on the prediction lane predicted from the previous driving lane or to update the tracking lane based on the lane change determination from the previous driving lane.

9. The driving lane determination apparatus according to claim 1, wherein the final driving lane decision unit is configured to compare the matching point calculated from the matching lane and the matching point calculated from the tracking lane with each other, and to decide a lane having a higher matching point as a final driving lane.

10. A driving lane determination method comprising:
acquiring map information and driving environment information;
deciding whether to perform driving lane determination entry based on the map information and the driving environment information;
matching the map information and the driving environment information to calculate a matching point of each lane upon deciding to perform the driving lane determination entry;
deciding a matching lane based on the calculated matching point;
deciding a tracking lane based on a prediction lane predicted from a previous driving lane and lane change determination upon deciding the matching lane; and
deciding a final driving lane based on the decided matching lane and the decided tracking lane,
wherein acquiring the map information and driving environment information comprises acquiring map information comprising precise map information and global positioning system (GPS) information and driving environment information comprising host vehicle position information, stationary object information, moving object information, and lane division line information.

11. The driving lane determination method according to claim 10, wherein deciding whether to perform driving lane determination entry comprises analyzing a driving road state based on the map information and the driving environment information, determining whether the analyzed driving road state satisfies a predetermined condition, and deciding the driving lane determination entry upon determining that the analyzed driving road state satisfies the predetermined condition.

12. The driving lane determination method according to claim 10, wherein calculating the matching point of each lane comprises, upon deciding the driving lane determination entry, extracting a precise map from the map information, extracting host vehicle position information, stationary object information, moving object information, and lane division line information from the driving environment information, and matching the host vehicle position information, the stationary object information, the moving object information, and the lane division line information with the precise map to calculate a matching point of each lane on the precise map.

13. The driving lane determination method according to claim 12, wherein a host vehicle position is matched with any one of a plurality of lanes on the precise map and wherein calculating the matching point comprises extracting stationary objects, moving objects, and lane division lines normally matched with the precise map, among stationary objects, moving objects, and lane division lines corresponding thereto, and calculating a matching point of a lane in which the host vehicle is located based on the normally matched stationary objects, moving objects, and lane division lines.

14. The driving lane determination method according to claim 13, wherein calculating the matching point of a lane in which the host vehicle is located comprises giving marks to the stationary objects, the moving objects, and the lane division lines normally matched with the precise map, and calculating the matching point of the lane in which the host vehicle is located as a sum of the marks of the normally matched stationary objects, moving objects, and lane division lines.

15. The driving lane determination method according to claim 10, wherein deciding the tracking lane comprises updating the tracking lane based on the prediction lane predicted from the previous driving lane or updating the tracking lane based on the lane change determination from the previous driving lane.

16. The driving lane determination method according to claim 10, wherein a deciding the final driving lane comprises comparing the matching point calculated from the matching lane and the matching point calculated from the tracking lane with each other, and deciding a lane having a higher matching point as a final driving lane.

17. A non-transitory computer-readable recording medium containing a program for performing the method according to claim 10.

18. A vehicle comprising:
a communication apparatus configured to receive map information;
a sensing apparatus configured to sense driving environment information of a host vehicle; and
a driving lane determination apparatus configured to determine a driving lane of the host vehicle based on the map information and the driving environment information, wherein the driving lane determination apparatus is configured to decide whether to perform driving lane determination entry based on the map information and the driving environment information, to match the map information and the driving environment information to calculate a matching point of each lane upon deciding to perform the driving lane determination entry, to decide a matching lane based on the calculated matching point, to decide a tracking lane based on a prediction lane predicted from a previous driving lane and lane change determination upon deciding the matching lane, and to decide a final driving lane based on the decided matching lane and the decided tracking lane,
wherein the driving lane determination apparatus is configured to acquire map information comprising precise map information and global positioning system (GPS) information and driving environment information comprising host vehicle position information, stationary object information, moving object information, and lane division line information.

* * * * *